FIG. 3
$V_g 13$
$V 26$ I
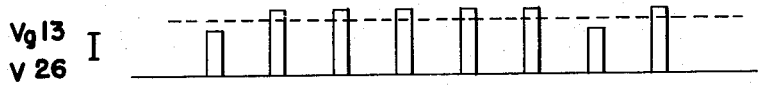
$I 26$ II
$V 55$ III
$I 16$ IV
$V 57$ V
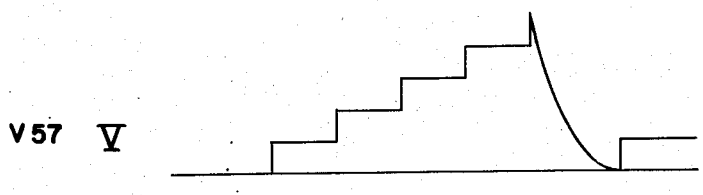

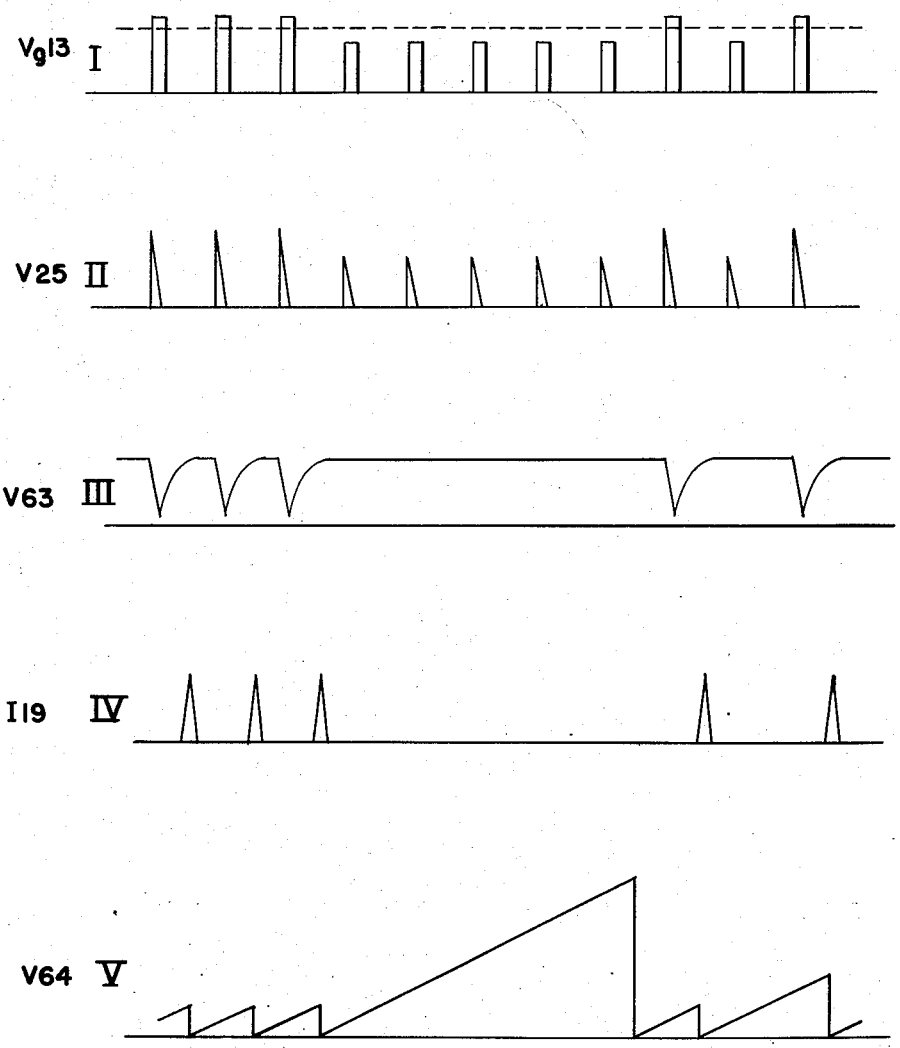

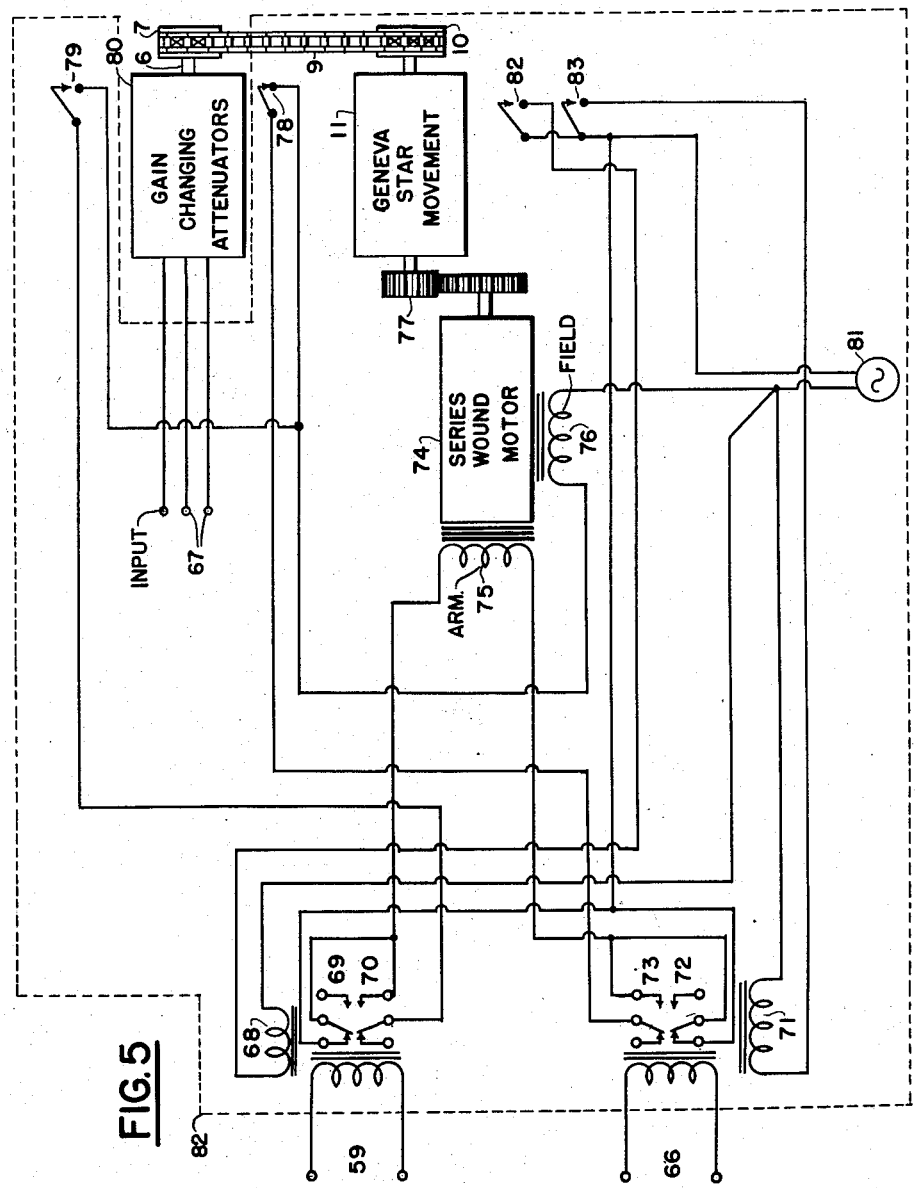

Patented Jan. 12, 1954

2,666,098

UNITED STATES PATENT OFFICE 2,666,098

VACUUM TUBE AMPLIFIER FOR MEASURING SIGNALS HAVING A LARGE VARIATION IN LEVEL

John L. Leonard, La Mesa, Calif.

Application December 13, 1945, Serial No. 634,844

4 Claims. (Cl. 179—171)

1

My invention relates to measuring of equipment and more particularly to methods of and means for adjusting a measuring device having a relatively small range of operation to measure signals having a relatively large range of volume.

It is frequently desirable to use a highly sensitive device such as a vacuum tube amplifier for purposes of measuring signals having a large variation in level. Unfortunately, however, the vacuum tube amplifier is not completely satisfactory for this purpose for the range of signal levels for which the vacuum tube amplifier constitutes an accurate measuring instrument is relatively small. For instance, in the application of a signal measuring system to test propagation of underwater sound waves it is necessary to indicate the level of signals varying over 90 decibels whereas the response of a good vacuum tube amplifier and recording galvanometer is accurate only over about 25 decibels. Under these circumstances, the vacuum tube amplifier is relatively ineffective for it can only accurately measure the level of incoming signals over a 25 decibel portion of the total 90 decibel range.

One method of avoiding the above mentioned difficulty is to provide a variable attenuating device in the input circuit of the amplifier so that the level of input signals may be adjusted to a value within the 25 decibel amplifier range. The true level of incoming signals will then correspond to the combination of the artificially introduced attenuation and the signals as measured by the amplifier. While this method satisfactorily increases the range over which the amplifier may be used as a measuring instrument, it requires that two readings be made instead of a single reading and in addition demands the attention of an operator. Where it is desired to avoid the need of an operator or to record a minimum number of readings, this method is not satisfactory.

I have discovered that the disadvantages associated with the use of an external attenuator in conjunction with an amplifier may be avoided by arranging the attenuator to be automatically actuated in predetermined steps as the level of the incoming signals vary. A record may be made of the changes in attenuation and this record, together with a record of the amplifier output provides an accurate indication of the level of incoming signals even though the incoming signals vary greatly in magnitude.

In accordance with another aspect of my invention, the automatic change in attenuation associated with a change in level of incoming

2 signals is delayed for a predetermined time. This prevents the attenuation from responding to short time irregularities in the level of the incoming signals, thereby preventing confusion in the resulting record and facilitating interpretation of the data obtained.

In accordance with a further aspect of my invention, the automatic changes in attenuation are made in predetermined steps which may be accurately established at equal values. It then becomes unnecessary to make an exact record of the operation of the attenuator inasmuch as the step-by-step changes constitute the entire information to be recorded. In fact, it is readily possible to provide a single record sheet on which both the output of the amplifier and the position of the attenuator is shown.

While the invention is susceptible of various modifications and alternative construction, I have shown in the drawings and will herein describe in detail the preferred embodiment. It is to be understood, however, that I do not intend to limit the invention by such disclosures for I aim to cover all modifications and alternative construction falling within the spirit and scope of the invention as defined in the appended claims.

In the figures:

Figure 3 is a diagram showing how my circuit responds to incoming signals in excess of the predetermined value.

Figure 4 shows how my invention responds to signals below the predetermined value.

Figure 5 is a schematic diagram of the electromechanical portion of my invention.

Figure 1:
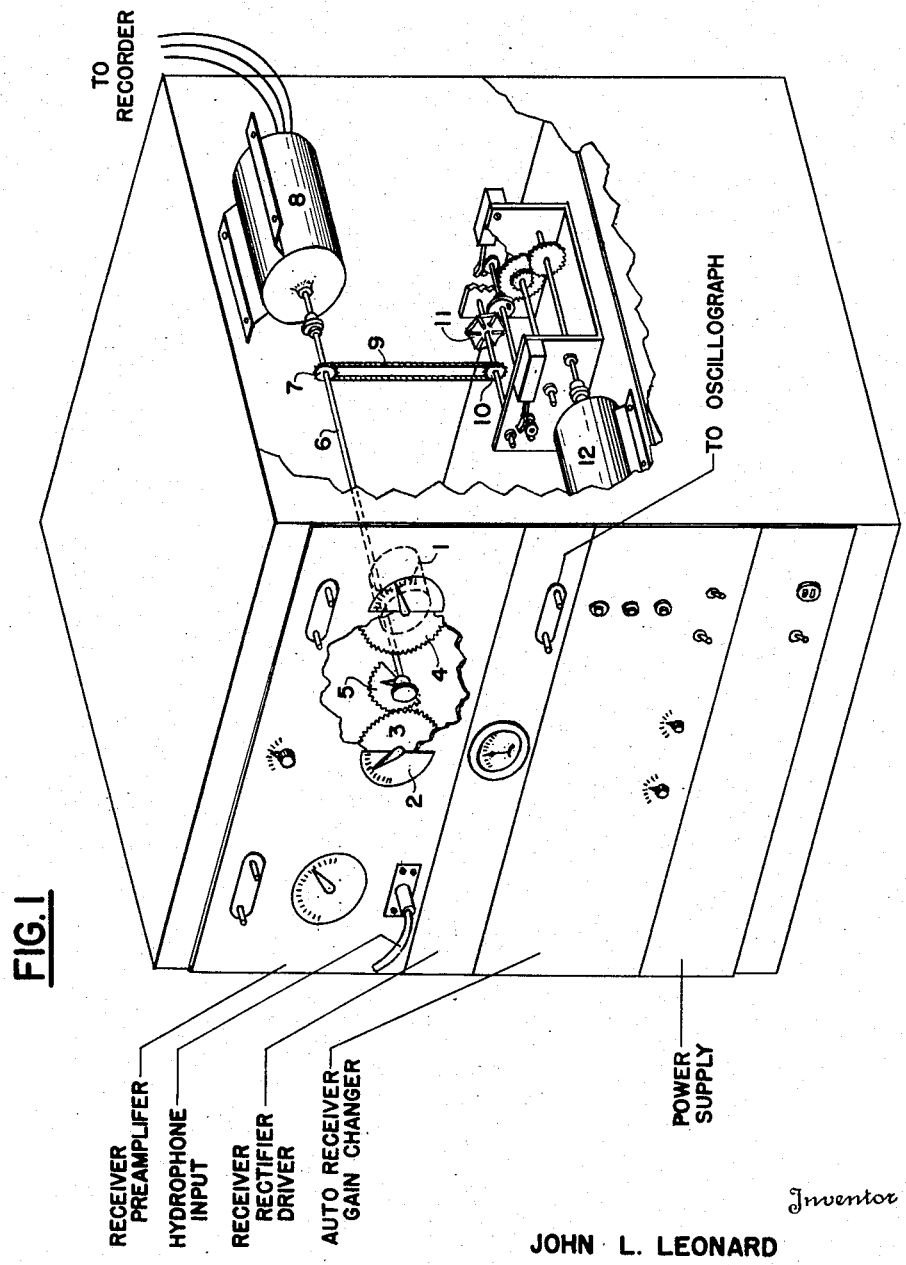
Figure 1 is a perspective view showing the mechanical components of my invention.

Referring now to Figure 1. Attenuators 1 and 2 comprise resistances operated by gears 3 and 4 and half gear 5 connected to shaft 6. Gears 3 and 4 and half gear 5 are arranged so that for a complete revolution of half gear 5 attenuators 1 and 2 are successively rotated over their entire range of rotation. Shaft 6 is attached to synchro transmitter 8 which in turn is connected to a repeater and recording mechanism. In addition, sprocket 7 is attached to shaft 6 and adapted to be rotated by chain 9. Sprocket 10 operates chain 9 and is in turn actuated by Geneva gear 11 attached to a gear train to which series wound motor 12 is connected. Hence, when motor 12 rotates over a predetermined angle, Geneva gear 11 rotates sprocket 10 one notch and attenuator 1 or attenuator 2 is correspondingly changed.

By the use of Geneva gear 11, I am enabled to obtain a highly accurate rotation of sprocket 10 even though I do not control the exact angular position of motor 12. Hence, by approximate control of motor 12 I am enabled to obtain a change in attenuation of accuracy adequate for measurement. By causing motor 12 to be actuated by the presence of amplifier output signals above or below predetermined levels, I achieve an automatic change in attenuation having a high degree of accuracy and which restores the signals to the desired operating range of the amplifier.

Figure 2:
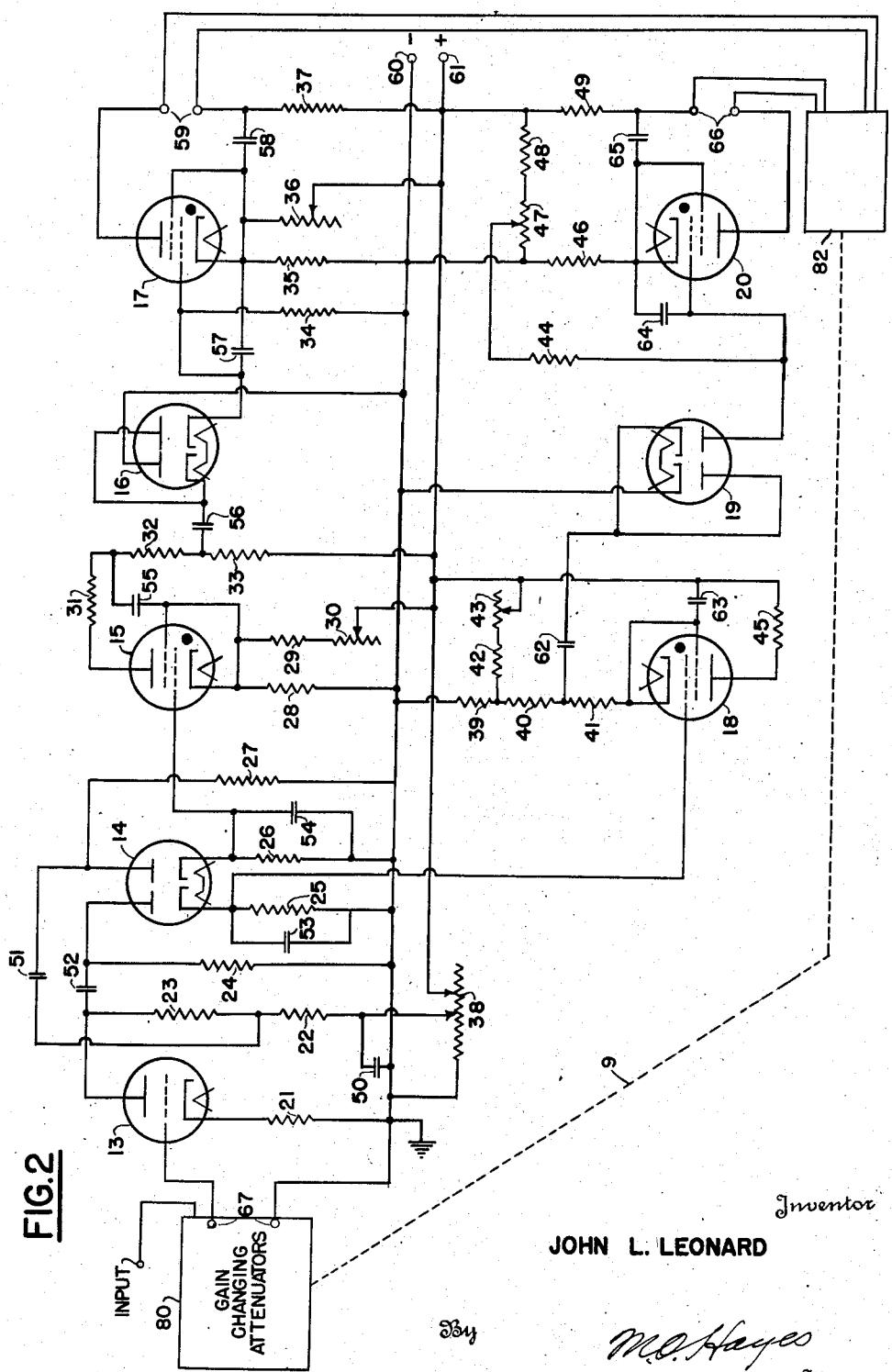
Figure 2 is a schematic diagram showing the circuit of my invention.

Figure 2 shows a detailed circuit diagram of the electronic portion of my invention. In the diagram, 13 is a vacuum tube having its grid connected to the input signals desired to be measured. The cathode of tube 13 is grounded through cathode bias resistance 21 and the anode connected to a source of positive voltage through resistances 23, 22 and adjustable resistance 38. By-pass condenser 50 provides a low impedance path to high frequency current around resistance 38. The anode of tube 13 is connected by coupling capacitor 52 to the anode of the first section of duplex diode 14. The cathode of the first section of tube 14 is connected by resistance 25 and by-pass condenser 53 to ground while the anode thereof is connected to ground by resistance 24. The common connection between resistors 22 and 23 is connected by coupling capacitor 51 to the anode of the second section of tube 14 and to ground through resistance 27. The cathode corresponding to this anode is connected to ground by resistance 26 which is by-passed by condenser 54. Tube 15 comprises a grid controlled gas discharge tube having its control grid connected to the cathode of the second section of tube 14 and its anode connected by resistances 31, 32 and 33 to a source of positive potential. The cathode of tube 15 is connected to ground by resistance 28 and to the source of positive potential by resistances 29 and 30, which provide adjustable positive cathode bias. Condenser 55 is connected between the cathode of tube 15 and the common connection between resistances 31 and 32. The common connection between resistances 32 and 33 is connected by means of coupling capacitor 56 to the cathode of the first section of tube 16 and the anode of the second section. The anode of the first section of tube 16 is connected directly to ground whereas the cathode of the second section is connected to the grid of gas discharge tube 17 and by coupling capacitor 57 to the cathode thereof. Resistance 34 connects the grid of tube 17 to ground. The cathode of tube 17 is connected to ground by resistance 35 and to the source of positive potential by adjustable resistance 36. This provides adjustable grid bias to tube 17. The anode of tube 17 is connected to one of the control relay terminals 59. The other terminal 59 is connected by resistance 37 to the source of positive potential and by condenser 58 to the cathode.

Considering now the circuit through tubes 18, 19 and 20. The grid of gas discharge tube 18 is connected to the cathode of the first section of tube 14. The anode of tube 18 is connected by resistance 45 to the source of positive potential. The cathode of tube 18 is connected by resistances 39, 40 and 41 to ground and the common connection of resistances 39 and 40 connected by resistance 42 and adjustable resistance 43 to the positive source of potential. This provides adjustable cathode bias for tube 18. Capacitor 63 is connected between the cathode of tube 18 and the positive potential. The common point between resistances 40 and 41 is connected by condenser 62 to the anode of the first section of tube 19 and the cathode of the second section. The cathode of the first section of tube 19 is connected directly to ground whereas the anode of the second section is connected to the grid of gas discharge tube 20. The grid of tube 20 is connected by resistance 44 to an adjustable voltage determined by the voltage divider action of resistances 47 and 48. This provides an adjustable grid bias for tube 20. The cathode of tube 20 is connected to ground by resistance 46. Condenser 64 is connected between the cathode and grid of tube 20. One terminal 66 of the minimum level control relay is connected by resistance 49 to the source of positive potential and capacitor 65 to the cathode of tube 20. The other terminal of the minimum level control relay is connected to the anode of tube 20.

Considering now the operation of my circuit as shown in Figure 2 with respect to the maximum level control relay connected to terminals 59. The input at terminals 67 comprises a succession of pulses the amplitude of which it is desired to measure. These pulses may be characteristic of the signals or may be obtained by actuating the amplifier only at predetermined intervals. Figure 3, curve I, shows a group of these pulses. When these pulses are applied to the grid circuit of tube 13, a plate current change takes place. This causes condenser 51 to discharge through the second section of diode 14, thereby producing a succession of voltage pulses across resistance 26. As shown in Figure 3, curve II, the magnitude of these pulses varies in accordance with the magnitude of the received pulses. Inasmuch as the voltage drop appearing across resistance 26 produces grid bias on tube 15, the latter tube is actuated in accordance with the magnitude of the pulses. If the pulse is such that voltage across resistance 26 is sufficient to cause gas discharge tube 15 to conduct, current will flow in the latter tube. On the other hand, if the voltage across resistance 26 due to the pulse of current through tube 14 is not adequate to fire tube 15, there will be no current flow through that tube.

When gas discharge tube 15 conducts, condenser 55 discharges through resistance 31 and tube 15. Inasmuch as the resistance of resistances 32 and 33 as well as the cathode resistance 28 is made very large, the current flow through tube 15 and these resistances is very small and when condenser 55 becomes relatively discharged, inadequate potential is available to cause current flow through tube 15 and conduction therethrough accordingly ceases. At this time, the grid of tube 15 again gains control and condenser 55 slowly charges up to the full value of the direct potential supply. This cycle for the pulses of Figure 3, curve I, is shown in Figure 3, curve III, which shows the voltage across condenser 55. In the case of the pulses exceeding the firing value of tube 15, condenser 55 rapidly discharges until current flow in tube 15 ceases. Thus the terminal voltage of condenser 55 is rapidly reduced to a low value. Condenser 55 then charges at a relatively slow rate, reaching a fully charged condition by the time the next pulse comes along. The voltage across condenser 55 therefore constitutes a series of sudden dips corresponding to the pulses applied to the input terminal 67 which are above the firing level of tube 15 and a series of relatively slow voltage increases corresponding to the charging action through resistances 28, 32 and 33.

When charging current flows through resistance 33 to condenser 56, the cathode of the first section of tube 16 is made negative with respect to the anode. Current flow then takes place until condenser 56 is discharged by the amount of the voltage drop in resistance 33. When tube 15 ceases to conduct, the voltage drop through resistance 33 disappears and condenser 57 is charged through the second section of tube 16. This current flow is shown in Figure 3, Curve IV. This charging tendency corresponds to the total voltage drop in resistance 33 when condenser 56 discharges through tube 15 and is independent of the magnitude of the initial pulse appearing at terminal 67 so long as that pulse fires tube 15. Inasmuch as the time constant corresponding to resistance 34 and condenser 57 is very long in respect to the time interval between pulses, condenser 57 is charged an equal amount for each pulse above the maximum level, thereby producing a stepped voltage at condenser 57 and the grid of tube 17. This is shown in Figure 3, Curve V.

The curves of Figure 3 are based on a succession of voltage pulses above the maximum level which occur at short intervals. In the event that two pulses above the maximum level are spaced by a considerable period of time, condenser 57 will discharge through resistance 34 to a significant degree. Hence the voltage pulses, to actuate tube 17, must be closely spaced, the spacing being determined by the time constant of condenser 57 and resistances 34 and 35. By adjusting the value of these resistances, I cause the system to respond to the particular combination of pulses that gives most effective operation.

When the voltage across condenser 57 reaches a value adequate to fire gas discharge tube 17, current flow takes place therethrough. This causes the cathode of 17 to become much more positive than in its quiescent condition due to the large voltage drop through resistor 35. This voltage charges condenser 57 through resistor 34 in a manner to make the grid of 17 very negative. Thus when conduction of 17 ceases, its grid has been returned or reset to some predetermined value below the firing voltage. This point may be varied by selection of the size 57, 34, 35, and 37. Inasmuch as the current flow in tube 17 passes through the maximum level control relay, the mechanical system is actuated to increase the attenuation. Gas discharge tube 17 automatically restores itself to the quiescent condition when condenser 58 discharges inasmuch as the resistance 37 is so large that tube 17 cannot maintain conduction if all the anode current must pass therethrough.

Considering now the control of the minimum level control relay exercised by tubes 18, 19, and 20. When a pulse appears at the grid of tube 18, a plate current increase takes place in the voltage drop of resistances 22, 23 and 38 is raised accordingly. This causes a voltage to appear across the first section of tube 14 and a corresponding current flow through resistance 25. The cathode of the first section of tube 14 swings positive and a positive pulse appears at the grid of gas discharge tube 18. Since the anode of the first section of tube 14 is connected directly to the anode of tube 13 through coupling capacitor 52, the voltage appearing at the grid of tube 18 is in excess of the value appearing at the grid of tube 15 by an amount depending on the voltage divider action of resistances 38 and 22 in conjunction with resistance 23. It therefore requires a smaller signal pulse at terminal 67 to cause tube 18 to conduct than to cause tube 15 to conduct when the two tubes are adjusted to fire at the same voltage. When tube 18 conducts, condenser 63 discharges through resistance 45, thereby causing condenser 62 to charge through the first section of diode 19 due to the sudden increase of charging current for condenser 63. When condenser 62 is charged and tube 18 ceases to conduct, condenser 64 is partially discharged through the second section of diode 19, condenser 62, and resistances 49, 39, and 46. If signals appear at the input 67 with sufficient frequency to prevent condenser 64 from ever charging up to a value sufficient to trigger gas discharge tube 20, no current flow will take place through minimum level control relay connected to terminal 66. On the other hand, if signals fail to come with sufficient frequency, condenser 64 will charge to a value adequate to fire tube 20 and current flow therethrough will take place. This current flow will exist until the charge on condenser 65 is dissipated and the system will then be restored to the initial unenergized condition.

The operation of the circuit through tubes 18, 19 and 20 is illustrated in Figure 4. In Figure 4, Curve I, shows a succession of pulses appearing at the input terminal 67. Some of these pulses are above the minimum level shown by the dashed curve and others are below that level. Curve II shows the voltage across resistance 25 corresponding to the pulses, the magnitude of this voltage being proportional to the magnitude of the incoming pulses. Inasmuch as the gas discharge tube 18 is arranged to conduct when the incoming pulses exceed the minimum level and to fail to conduct when incoming pulses do not exceed the minimum level, current flow through tube 18 takes place only when pulses exceeding the minimum level are received. The resulting voltage at condenser 63 is as shown in Figure 4, Curve III. This curve consists of a sudden discharge associated with each of the pulses exceeding the minimum level and a relatively slow recovery to normal voltage after each discharge. This curve is directly analogous to Curve III, Figure 3. The current flow through the second section of diode 19, and the corresponding current tending to discharge condenser 64, is shown in Figure 4, Curve IV. This current consists of a pulse corresponding to each of the incident pulses which exceed the minimum value. The resulting charge of condenser 64, and the corresponding bias on gas discharge tube 20, is shown in Figure 4, Curve V. During the period when successive pulses exceed the minimum value, condenser 64 is repeatedly discharged and the voltage appearing at the grid of tube 20 consists of a saw tooth wave which never reaches a value sufficient to fire the tube. On the other hand, when a long period wherein no pulses are received takes place, condenser 64 continues to charge until eventually the firing voltage of tube 20 is reached. At this time conduction will take place from condenser 65 through tube 20 and the resulting voltage across R46 will reset condenser 64 below the firing voltage. The current flow from capacitor 65 will actuate the minimum level control relay and cause the attenuation in the amplifier circuit to be decreased, thereby raising the level of the input signals amplifier to the best operating portion of the amplifier range.

In order to achieve the time delay in operation of my circuit as shown in Figure 2, I provide tubes 17 and 20 with grid bias such that condenser 57 and 64 reach the desired trigger voltages only after a succession of signals from tubes 15 and 18 which persist over the desired time delay. In the case of tube 17, this is accomplished by adjusting resistor 36 which varies the potential of the cathode of tube 17 and hence the value of charge at which condenser 57 will cause the tube to conduct. In the case of tube 20, resistance 47 has a similar function for it changes the voltage applied to condenser 64 and hence the time required for it to charge to the potential wherein tube 20 fires.

Figure 2 also shows schematically the relationship of the electronic circuit to the remaining apparatus. The signal input is fed to the gain changing attenuators represented by the block 80. The output of the attenuators is fed through the electronic system as described above and the output terminals 59 and 66 are connected to the relays in the block 82. Block 82 contains the relays and motor system shown in detail in Figure 5. The mechanical linkage represented schematically by the dotted line in Figure 2 is also shown in its actual form in the chain 9 of Figure 5. Like reference characters used in the two figures further serve to point out the relationship of the various elements.

Referring now to Figure 5 which shows in schematic form the mechanical elements of my system. Terminals 59 are connected to the operating coil of the maximum level control relay. Contacts 69 and 70 are controlled by current in this coil or release coil 68. Terminals 66 are connected to the operating coil of the minimum level control relay. Contacts 72 and 73 are actuated by this coil and release coil 71. Series wound motor, 74, has its armature 75, connected to normally closed relay contacts 69 and 72 and normally open relay contacts 70 and 73. The field of this motor is connected through limit switches 78 and 79 to contacts 70 and 73 respectively. The limit switches are opened when the attenuator drive travels beyond its limit in either direction. Gear 77 is connected to motor 74 and drives the Geneva movement 11 which in turn operates chain drive 9 on shaft 6. The latter operates the attenuators, 80, as shown in detail in Figure 1.

When a signal appears at terminals 59, contacts 69 are opened and contacts 70 closed. Current then flows from source 81 through field 76 of motor 74 to limit switch 79, through contacts 70 to armature 75. Passing through the armature, the current flows to contacts 72 to the opposite side of source 81. Motor 74 therefore turns in a direction corresponding to the armature and field connections. After motion sufficient to operate the Geneva movement 11 takes place, relay release switch 82 is closed. This causes current flow through relay release coil 68, thereby causing contacts 69 and 70 to return to their normal position.

When a signal appears at terminal 66, relay contacts 72 are opened and contacts 73 closed. Current flow will then take place from source 81, through field 76 of motor 74 to limit switch 78. From there current flows through contacts 73 to armature 75, and contacts 69 to the opposite terminal of source 81. In this case, however, the direction of current flow through armature 75 as compared with that when coil 59 is actuated so that the rotation of series wound motor 74 is in the opposite direction. This causes Geneva movement 11 to rotate in the reverse direction, thereby moving attenuator 80 to decrease the attenuation. When Geneva movement 11 has moved, relay release switch 83 is actuated, thereby causing current flow in the release coil 71 and returning contacts 72 and 73 to their previous positions.

Relay contacts 69 are adapted to be opened by current in actuating coil 59 whereas relay contacts 70 are adapted to be closed by current in coil 59. The construction of the relay is such that it locks mechanically when actuated so that the contacts remain in this position even though current flow through coil 59 ceases. When switch 82 closes, the locking mechanism in the relay is opened and contacts 69 are closed and contacts 70 opened. Upon subsequent current flow in tube 17, contacts 69 are opened and contacts 70 closed for a sufficient time by current flow in coil 59 to swing the Geneva star movement 11 beyond the point at which relay release switch 82 is closed. Further motion of the movement takes place until the next closing point of relay 82 is reached. Similarly, contacts 72 and 73 coact with release switch 83 to cause motor 74 to swing Geneva star movement 11 one step in the reverse direction when tube 20 is fired.

In order to prevent recycling of the mechanical system, I design condensers 65 and 58, Figure 2, to have capacity such that tubes 17 and 20 cease conduction by the time relay release coil 68 and 71 are actuated.

In the event that signals to be amplified are continuous signals not arriving in discrete pulses, a number of methods are available whereby the control operation above described may be achieved. One method would be to block the operation of the amplifier except for predetermined intervals corresponding to the pulses desired to apply to the automatic gain control circuit. This could be done by biasing a tube in the amplifier circuit beyond cut-off bias. As an alternative, tube 13 of the gain changer circuit could be provided with a circuit which gives it zero grid bias except at predetermined instants corresponding to the time when pulses are desired to be applied to the automatic gain control circuit. In either event, the operation of the gain control circuit is identical with that described above.

The selection of components for my system may be given wide variation. I do not intend to be limited by any particular values of the components within the spirit and scope of my invention. Merely by way of illustration, however, I may use the following values:

13—6Q7 vacuum tube
14—6H6 vacuum tube
15—2050 thyratron
16—6H6 vacuum tube
17—2050 thyratron
18—2050 thyratron
19—6H6 vacuum tube
20—2050 thyratron
21—3300 ohms resistance
22—27,000 ohms resistance
23—68,000 ohms resistance
24—1 megohm resistance
25—2.2 megohms resistance
26—2.2 megohms resistance
27—1 megohm resistance
28—33,000 ohms resistance
29—220,000 ohms resistance 30—1 megohm variable resistance
31—100 ohms resistance
32—33,000 ohms resistance
33—820,000 ohms resistance
34—10 megohms resistance
35—560,000 ohms resistance
36—10 megohms variable resistance
37—120,000 ohms resistance
38—100,000 ohms variable resistance
39—8,200 ohms resistance
40—1 megohm resistance
41—5,600 ohms resistance
42—180,000 ohms resistance
43—1 megohm variable resistance
44—10 megohms
45—100 ohms resistance
46—560 ohms resistance
47—75,000 ohms variable resistance
48—220,000 ohms resistance
49—22,000 ohms resistance
50—40 microfarads capacity
51—.005 microfarads capacity
52—.005 microfarads capacity
53—.0002 microfarads capacity
54—.0002 microfarads capacity
55—.25 microfarads capacity
56—.1 microfarads capacity
57—1.0 microfarads capacity
58—2.0 microfarads capacity
62—.015 microfarads capacity
63—.25 microfarads capacity
64—2.0 microfarads capacity
65—2.0 microfarads capacity

I claim:

1. A measuring circuit including an amplifier having input and output circuits, an attenuator in the input circuit of said amplifier, a first electronic relay circuit connected to said amplifier output circuit responsive only to the occurrence of a predetermined number of output pulses above a predetermined magnitude but independent of the average output pulse level, a second electronic relay circuit responsive only to the occurrence of a predetermined number of output pulses below a predetermined magnitude but independent of the average output pulse level, adjusting means responsive to the said first and second electronic relay circuits operating said attenuator to decrease the level of the signal input to said amplifier in response to operation of said first electronic relay circuit and operating said attenuator to increase the level of the signal input to said amplifier in response to operation of said second electronic relay circuit.

2. A measuring circuit comprising a channel including at least one gas tube and a condenser connected in the input circuit of the gas tube, said condenser charging to activate the tube in response to a predetermined number of signal pulses above a predetermined level and another channel including at least one gas tube and a condenser connected in the input circuit of the gas tube, said condenser charging to activate the tube in response to a predetermined number of pulses below a predetermined signal level, each of said channels having an individual relay responsive to activation of said tubes, and attenuator means connected to the input of said measuring circuit and responsive to operation of said relays decreasing the input signal level a predetermined amount when the relay in said first-mentioned channel is actuated and increasing the input level a predetermined amount when the relay in said last-mentioned channel is actuated, both of said channels being connected to the output of said measuring circuit.

3. A system as described in claim 2 wherein each channel has a delay means, said delay means acting to prevent operation of the gas tube unless there is a sustained variation in the signal pulse level.

4. In a system for operating an amplifier within its most effective range comprising in combination an amplifier, a calibrated attenuator connected to the input circuit of said amplifier, means to supply input signals to said attenuator, an electronic counting channel connected to the output circuit of said amplifier and including a plurality of thermionic tubes, at least one of said tubes having a condenser connected in the input circuit thereof, a charging circuit for said condenser responsive to an amplifier output level above a predetermined level to render said thermionic tubes conductive, a second electronic counting channel connected to the output of said amplifier and including a second plurality of thermionic tubes, at least one of said second tubes having a second condenser connected in the input circuit thereof, a charging circuit for said second condenser responsive to an amplifier output level below a predetermined level to render said second thermionic tubes conductive, a time delay means connected in the input circut of each counting channel, individual relay means connected in the output circuit of each counting channel energized by conductivity of the thermionic tubes, reversible motor means selectively controlled by the energization of said relay means and means including a Geneva gear driven by said motor means driving said attenuator in predetermined steps to maintain the signal level through the amplifier within its most effective range.

JOHN L. LEONARD.

References Cited in the file of this patent

UNITED STATES PATENTS

| Number | Name | Date |
|---|---|---|
| 472,193 | Marshall | Apr. 5, 1892 |
| 1,447,773 | Espenschied | Mar. 6, 1923 |
| 1,811,954 | Mitchell | June 30, 1931 |
| 1,888,227 | Horton | Nov. 22, 1932 |
| 1,935,759 | Abraham | Nov. 21, 1933 |
| 2,010,644 | Reinstra | Aug. 6, 1935 |
| 2,280,949 | Hall | Apr. 28, 1942 |
| 2,292,159 | Richardson | Aug. 4, 1942 |
| 2,344,562 | Potter | Mar. 21, 1944 |
| 2,399,266 | Stiefel | Apr. 30, 1946 |
| 2,456,952 | Kluender | Dec. 21, 1948 |
| 2,509,185 | Eckel | May 23, 1950 |
| 2,542,066 | Varela | Feb. 20, 1951 |
| 2,547,809 | Burger | Apr. 3, 1951 |